(12) United States Patent
Valencia et al.

(10) Patent No.: US 8,347,865 B2
(45) Date of Patent: Jan. 8, 2013

(54) SYSTEM AND METHOD FOR RETURNING OIL SEPARATED FROM ENGINE CRANKCASE GASES

(75) Inventors: Frank Acierno Valencia, Canton, MI (US); Christopher K. Palazzolo, Ann Arbor, MI (US); Paul T. Reinhart, Livonia, MI (US); Timothy Gerald Taylor, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/103,165

(22) Filed: May 9, 2011

(65) Prior Publication Data

US 2011/0283979 A1 Nov. 24, 2011

(51) Int. Cl.
*F02B 25/06* (2006.01)
(52) U.S. Cl. ...... 123/574; 123/572; 123/573; 123/196 R
(58) Field of Classification Search .................. 123/574, 123/573, 572, 196 R
See application file for complete search history.

(56) References Cited

U.S. PATENT DOCUMENTS

| | | | |
|---|---|---|---|
| 2,818,052 A | 12/1957 | Trainer | |
| 4,156,406 A * | 5/1979 | Brandau et al. | 123/41.86 |
| 5,072,583 A | 12/1991 | Urushihara et al. | |
| 5,850,823 A * | 12/1998 | Kasahara | 123/572 |
| 6,062,024 A | 5/2000 | Zander et al. | |
| 6,089,213 A * | 7/2000 | Laudien et al. | 123/572 |
| 6,099,374 A | 8/2000 | Watanabe et al. | |
| 6,234,154 B1 | 5/2001 | Spix | |
| 6,295,963 B1 | 10/2001 | Kollock et al. | |
| 6,460,524 B2 * | 10/2002 | Kimura | 123/572 |
| 6,513,506 B1 | 2/2003 | Ito et al. | |
| 6,981,574 B1 | 1/2006 | Bedi | |
| 7,089,737 B2 | 8/2006 | Claus | |
| 7,117,858 B2 | 10/2006 | Nonaka et al. | |
| 7,367,294 B2 | 5/2008 | Rozario et al. | |
| 7,784,442 B2 | 8/2010 | Lester et al. | |
| 8,051,648 B2 * | 11/2011 | Son et al. | 60/323 |
| 2003/0056502 A1 | 3/2003 | Katayama et al. | |
| 2008/0011264 A1 * | 1/2008 | Kawamura et al. | 123/196 R |
| 2009/0199794 A1 | 8/2009 | Slaughter et al. | |
| 2009/0241526 A1 | 10/2009 | Son et al. | |
| 2010/0018308 A1 * | 1/2010 | Liimatta et al. | 73/290 B |
| 2010/0101514 A1 * | 4/2010 | Hirano et al. | 123/41.86 |
| 2010/0175642 A1 | 7/2010 | Herman et al. | |
| 2010/0180872 A1 | 7/2010 | Monros | |
| 2011/0011366 A1 * | 1/2011 | Kauer et al. | 123/196 R |

* cited by examiner

*Primary Examiner* — Nathaniel Wiehe
*Assistant Examiner* — James Kim
(74) *Attorney, Agent, or Firm* — Julia Voutyras; Alleman Hall McCoy Russell & Tuttle LLP

(57) ABSTRACT

A system for processing PCV gases is disclosed. In one example, the system includes an oil passage solely linking an oil separator to an engine crankcase. The system can provide an oil column that provides for continuous oil return from the oil separator to the engine crankcase even during conditions of higher levels of engine vacuum.

20 Claims, 6 Drawing Sheets

SYSTEM AND METHOD FOR RETURNING OIL SEPARATED FROM ENGINE CRANKCASE GASES

BACKGROUND/SUMMARY

Gases may form in an engine crankcase when gases from engine cylinders bypass engine pistons and enter the crankcase during engine rotation. The gases can be combusted within engine cylinders to reduce engine hydrocarbon emissions via returning the crankcase gases to the engine air intake and combusting the gases with a fresh air-fuel mixture. However, the crankcase gases may include engine oil mist. If engine oil is combusted by the engine, engine oil consumption may increase. In addition, performance of exhaust gas after treatment devices may degrade when engine oil is combusted. Therefore, it may be desirable to separate oil from crankcase gases that are directed from the engine crankcase to the engine air intake.

Combusting crankcase gases via the engine cylinders may require a motive force to move the crankcase gases from the engine crankcase to the engine air intake. One way to provide motive force to move crankcase gases to engine cylinders is to pneumatically couple the output of an engine oil separator receiving engine crankcase gases with a low pressure region (e.g., vacuum) of the engine intake system (e.g., the engine intake manifold between engine cylinders and an engine throttle body). Vacuum can draw crankcase gases to engine cylinders, but vacuum may also act on engine oil separated from crankcase gases, thereby making it more difficult to return engine oil to the engine crankcase. The vacuum acting on the separated oil may be overcome by building oil head pressure. In other words, the weight of the column of oil can work against the vacuum and allow the separated oil to be returned to the engine crankcase. The oil head pressure may be provided via the weight of separated engine oil stored in a column. However, depending on the amount of vacuum supplied to move crankcase vapors to the engine air intake, an oil column of more than 9 cm. may have to be produced to overcome the vacuum moving the crankcase gases. An oil column as such can increase the height of an engine and help to degrade vehicle fuel economy since it may increase a vehicle's coefficient of drag.

In addition, separated oil may be returned to the engine sump to promote oil mixing and to ensure oil used throughout the engine is at a more uniform temperature. However, an oil return line or passage may have to utilize a portion of the engine structure that may be useful for other purposes (e.g., engine block stiffening or coolant passage area). Thus, the positive crankcase ventilation (PCV) oil return passage may compete with other engine elements and features for sought after engine structure.

The inventors herein have recognized the above-mentioned disadvantages and have developed an engine system, comprising: an engine cylinder block; a cylinder head coupled to the engine cylinder block; a cylinder head cover coupled to the cylinder head; a dipstick oil passage extending through the cylinder head cover, the cylinder head, and the engine cylinder block to an engine crankcase.

By integrating the dipstick passage with the PCV oil return it may be possible to more efficiently use engine structure while providing adequate oil head pressure to overcome engine vacuum that extracts crankcase gases. In one example, the PCV oil return passage may accept engine oil solely from an engine oil separator and extend from a cylinder head to the engine crankcase. Thus, the PCV oil return passage allows for oil head pressure to build within the passage so that engine vacuum can be overcome. Further, via accepting an oil dipstick, the PCV oil return passage may more efficiently utilize engine structure by providing increased functionality.

The present description may provide several advantages. In particular, the approach may provide increased functionality so as to better utilize engine structure via increased PCV oil return passage functionality. In addition, the approach can leverage the length of the PCV oil return passage to provide additional oil head pressure so that oil from an oil separator may be continuously returned to the engine oil sump even during conditions of higher engine manifold vacuum.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
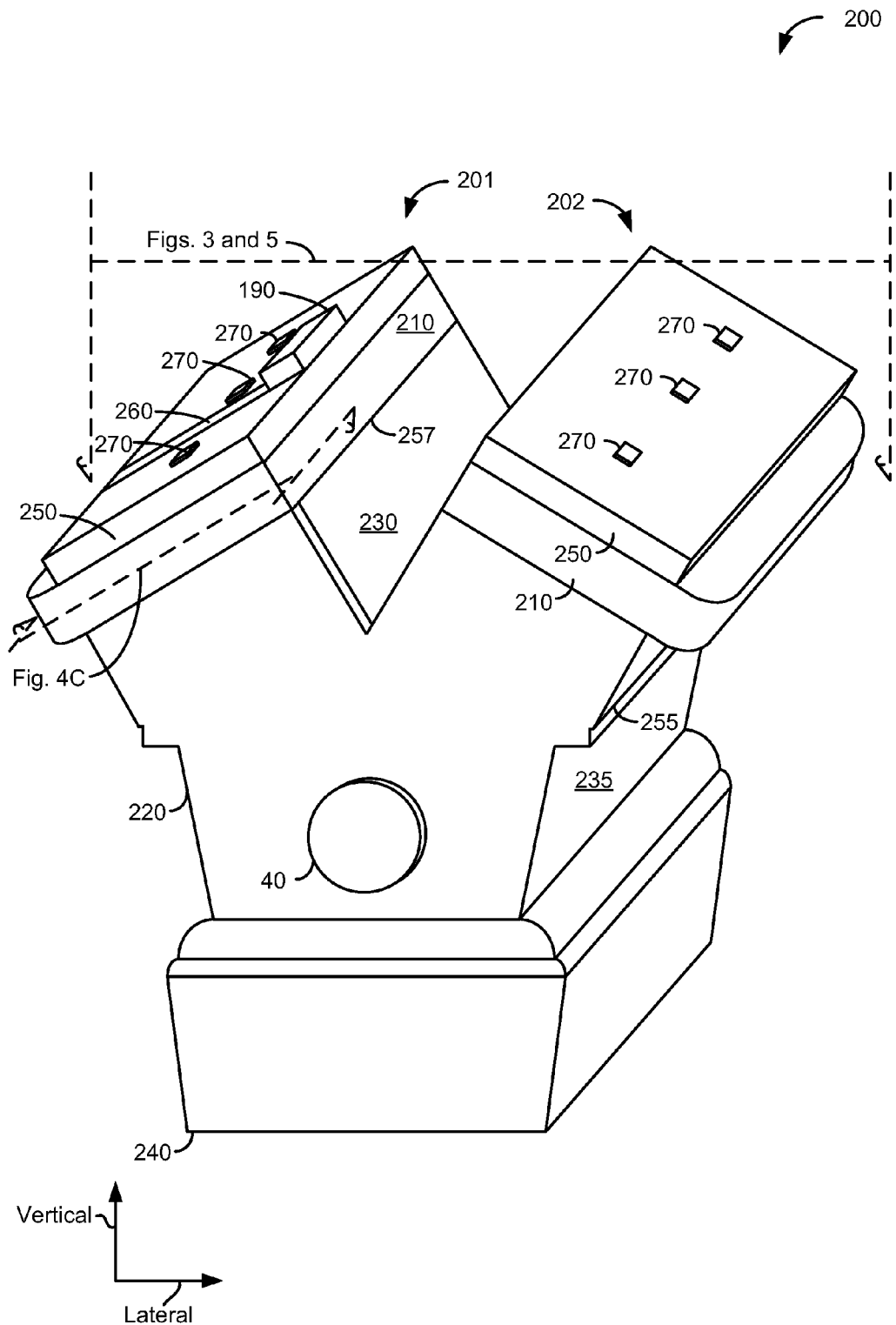
FIG. 2 shows a schematic depiction of a V6 engine.
Figure 3:
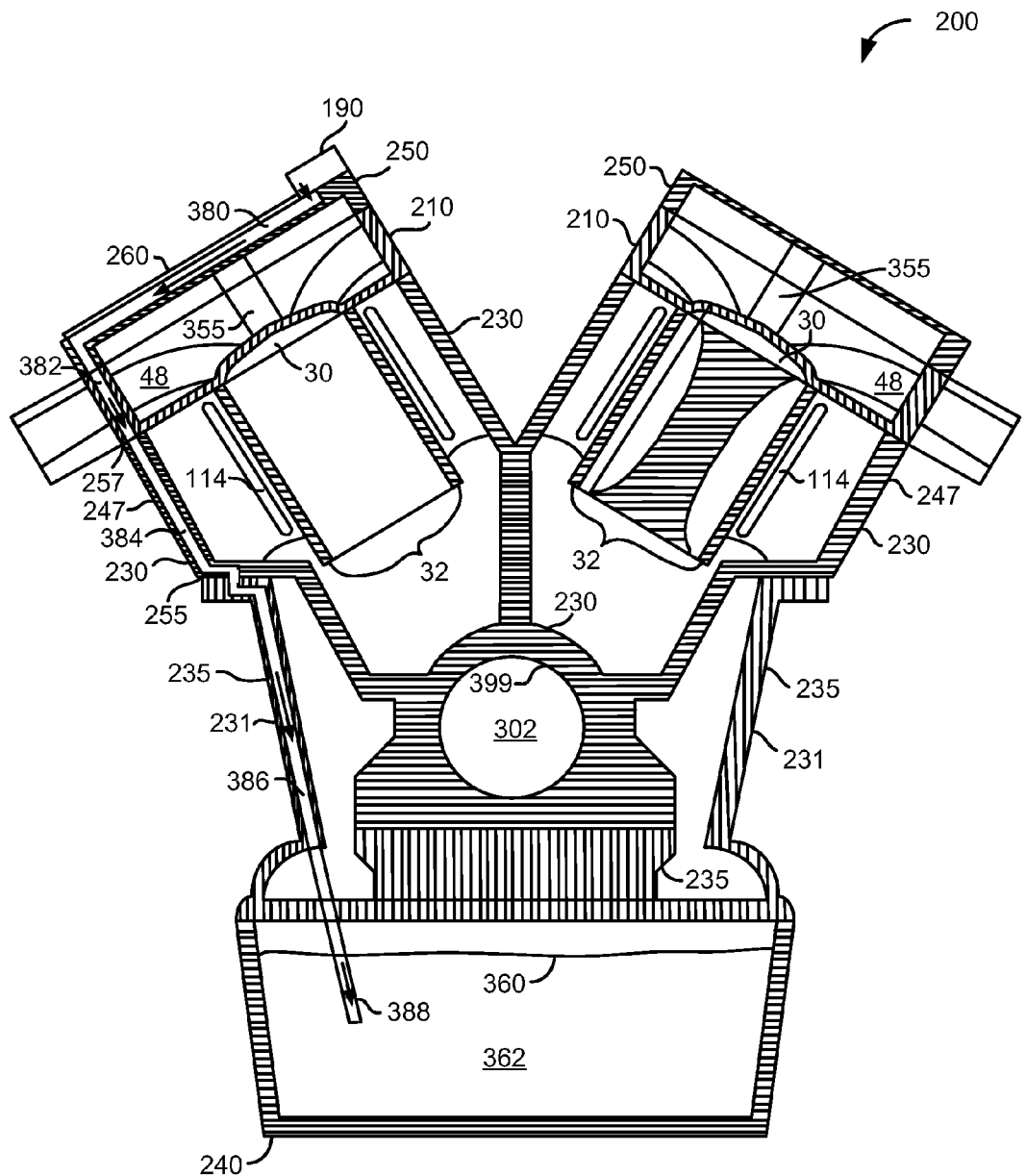
FIG. 3 shows a cut-away section of the V6 engine depicted in FIG. 2.
Figure 4A:
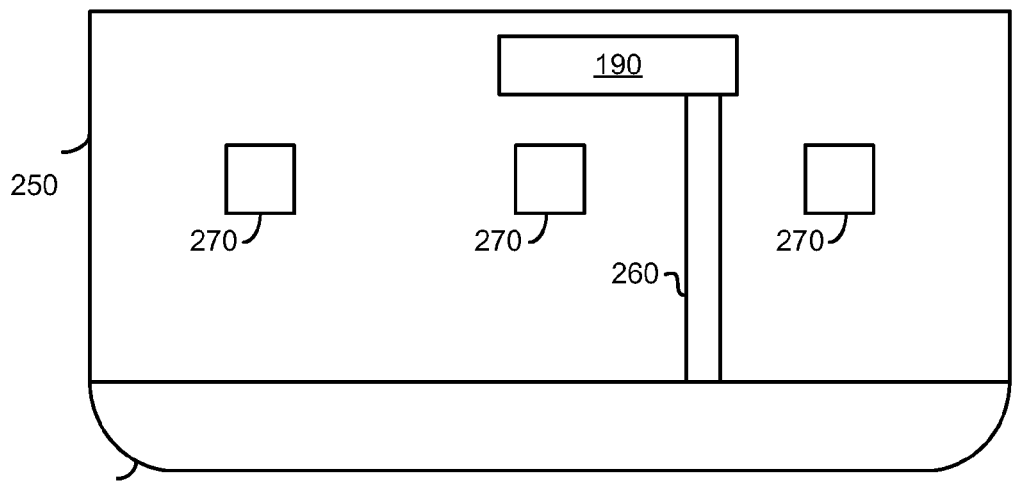
FIGS. 4A-4C show plan views of a cylinder head cover and cylinder head.
Figure 4B:
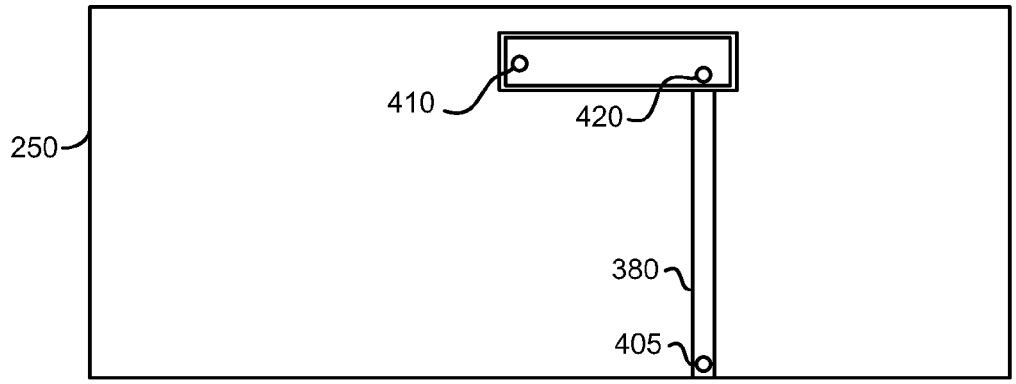
Figure 4C:
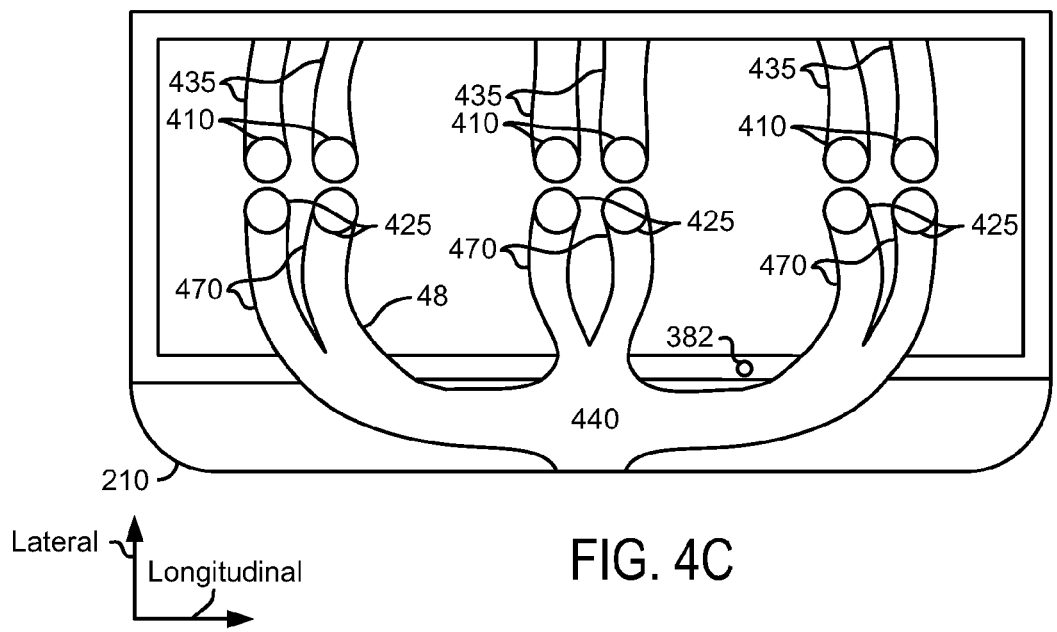
Figure 5:
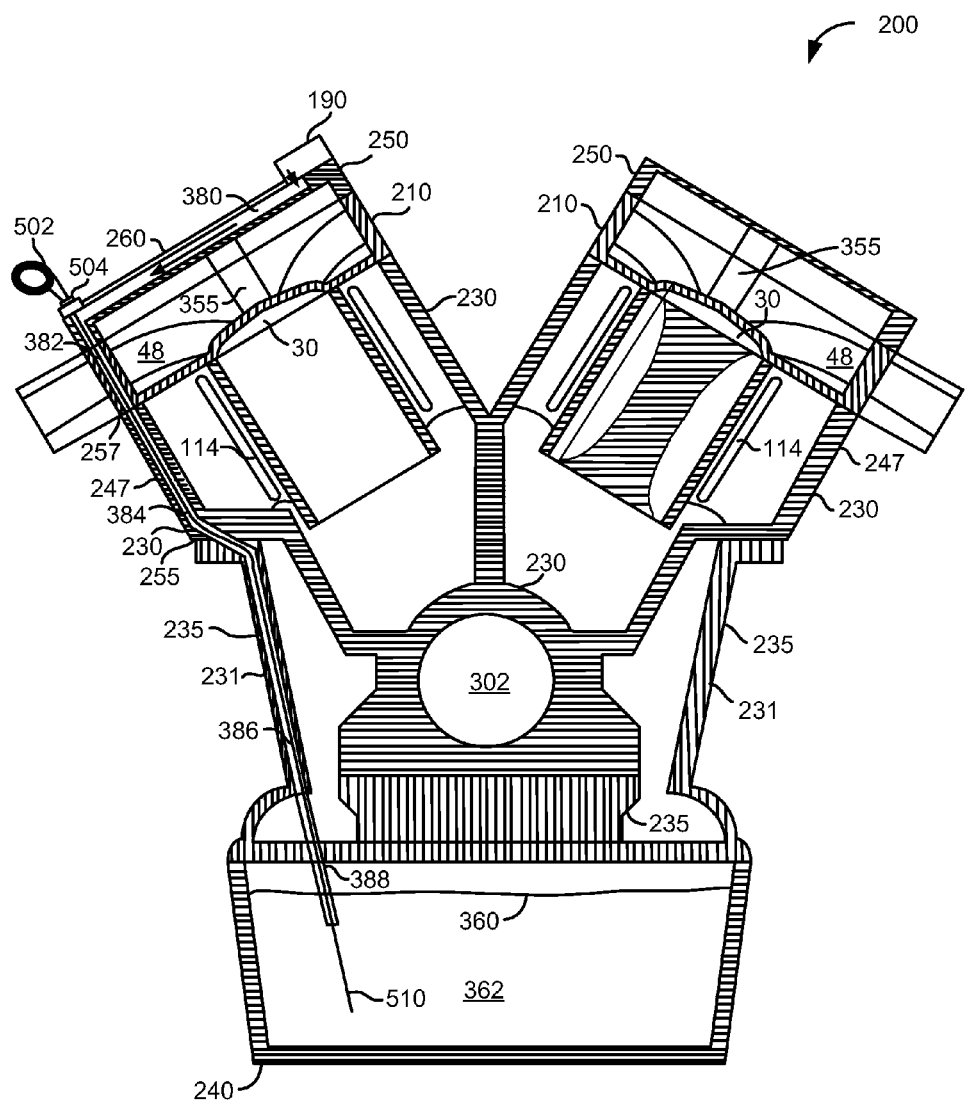
FIG. 5 shows a cut-away section of another example V6 engine.
Figure 6:
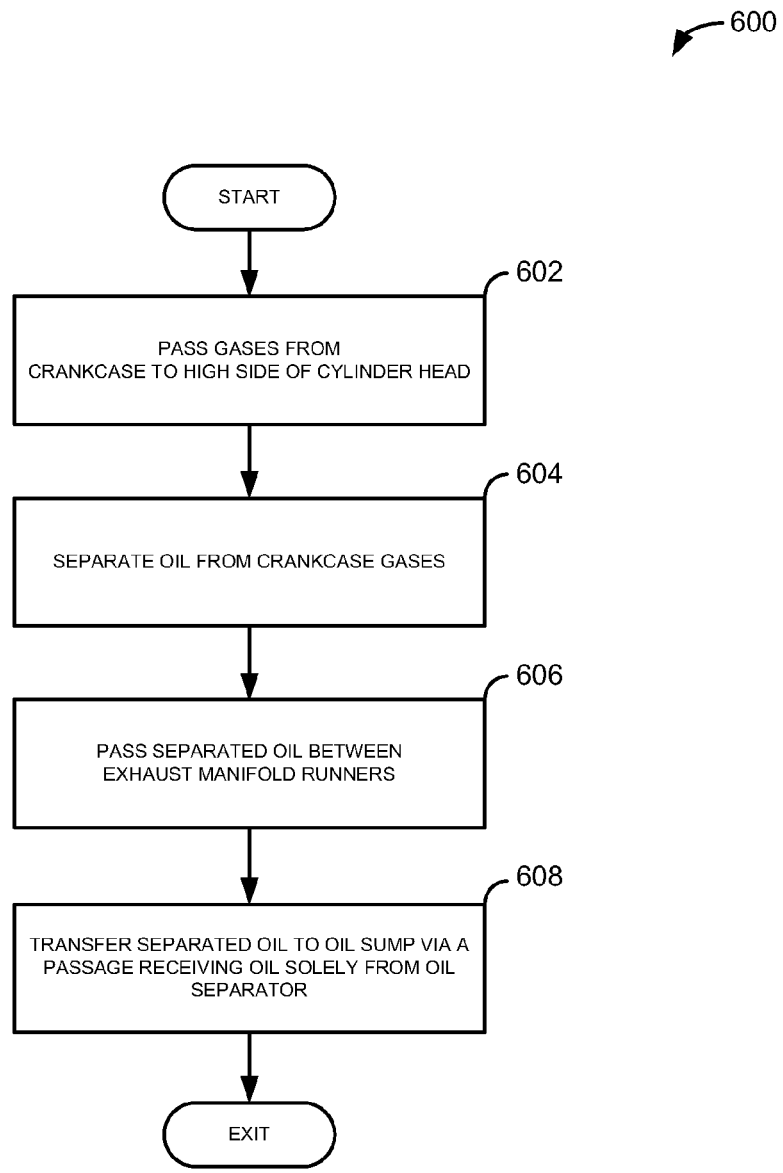
FIG. 6 shows a flowchart of an example method for separating oil from crankcase gases.

The present description is related to separating oil from crankcase gases. In one example, crankcase gases may be directed to a low pressure region of an engine air intake system (e.g., downstream of throttle and upstream of engine cylinders) to promote the flow of gases from the crankcase to the engine air intake. FIG. 2 shows an example V6 engine where oil is separated from crankcase gases and returned to an oil sump within the engine crankcase. FIG. 3 shows an engine cross section that reveals the PCV engine oil return path from an oil separator to the oil sump. FIGS. 4A-4C show plan views of a cylinder head cover and cylinder head. The plan views show one example of a PCV oil passage location. FIG. 5 shows one example of an engine oil dipstick passage integrated with a PCV oil passage. Finally, FIG. 6 shows a flowchart for an example method for separating oil from crankcase gases.

Figure 1:
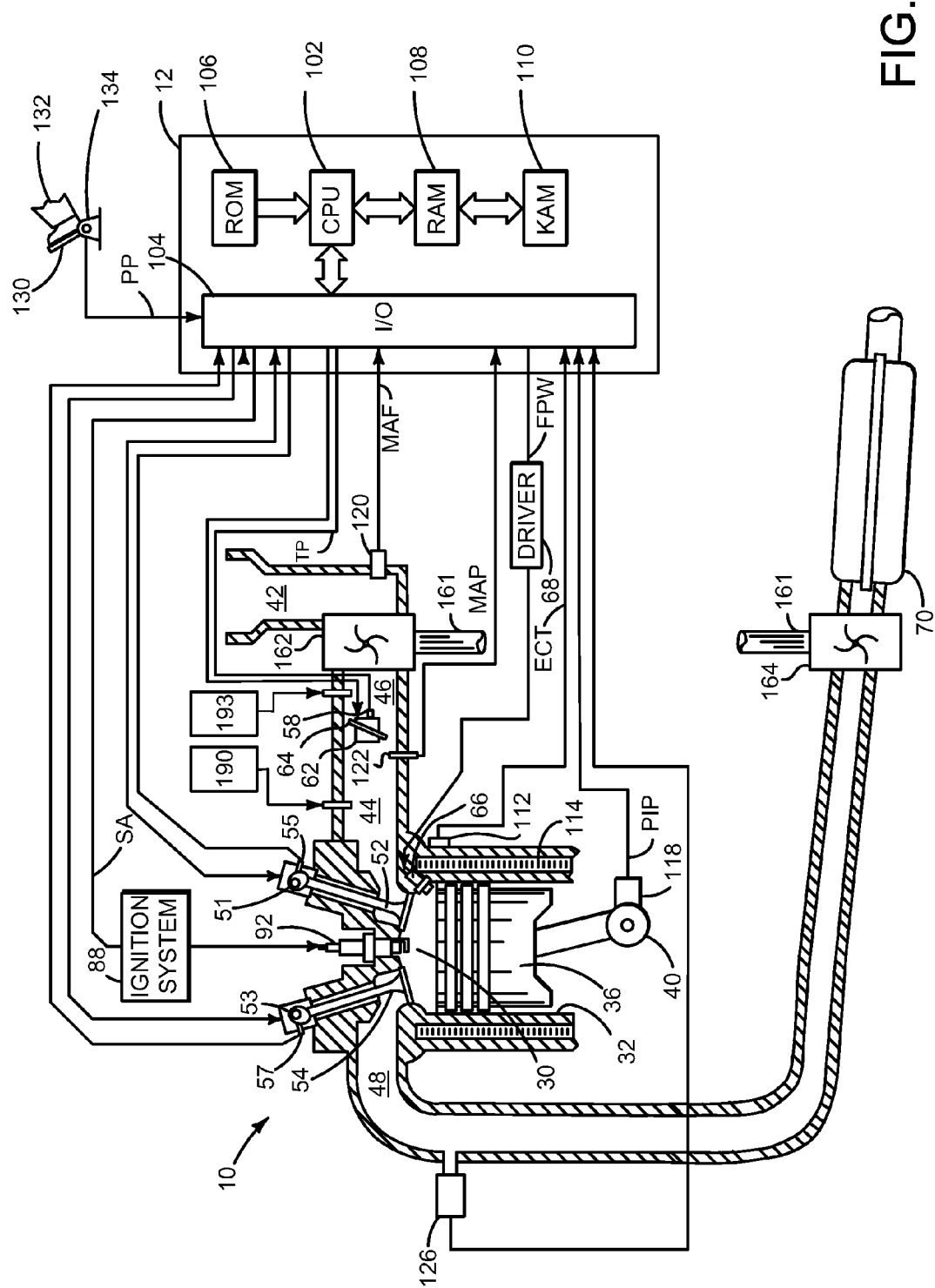
FIG. 1 shows a schematic depiction of one cylinder of an engine and a PCV oil separator.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from intake boost chamber 46. Compressor 162 draws air from air intake 42 to supply boost chamber 46. Exhaust gases spin turbine 164 which is coupled to compressor 162 via shaft 161. A high pressure, dual stage, fuel system may be used to generate higher fuel pressures at injectors 66.

A PCV oil separator 190 separates oil from crankcase gases. In one example, the PCV oil separator may be coupled to the engine as shown in FIG. 2. Crankcase gases are supplied to the PCV oil separator via passages that pass between the engine crankcase and the engine cylinder head. PCV oil separator 190 is shown in communication with intake manifold 44 at a location between the engine cylinder and electronic throttle 62. When intake manifold pressure is low, crankcase gases may be drawn from PCV oil separator 190 to intake manifold 44.

Engine crankcase 193, shown in more detail in FIG. 3, receives fresh air from the engine intake air system at a location upstream of throttle 62. In the present example, engine crankcase 193 receives fresh air from the engine intake air system at a location downstream of compressor 162. However, in some examples compressor 62 may be omitted. Thus, the engine crankcase may be ventilated by drawing air from the engine air intake system at a higher pressure location, and returning the air to the engine air intake system at a lower pressure location.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a knock sensor for determining ignition of end gases (not shown); a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some embodiments, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples.

Referring now to FIG. 2, a schematic depiction of a V6 engine is shown. Engine 200 includes first cylinder bank 201 and second cylinder bank 202. The first and second cylinder banks each house three pistons arranged in a line that provide torque to rotate crankshaft 40. Engine oil pan 240 is coupled to ladder frame 235 and holds oil in a sump for lubricating components of engine 200. Engine front cover 220 seals the front of engine 200 from external elements. Ladder frame 235 includes sidewalls that extend vertically above the crankshaft 40 so as to provide support for engine cylinder block 230. The exterior sidewalls of engine cylinder block 230 end at a position vertically above crankshaft 400 and extend from a cylinder head engaging surface 257 to a ladder frame engaging surface 255.

Cylinder heads 210 are coupled to engine cylinder block 230 and include an integrated exhaust manifold as shown in FIG. 4C. Cylinder head covers 250 are shown coupled to cylinder heads 210. The cylinder head covers seal the upper portion of engine 200 from external elements and help to keep engine oil within engine 200. Spark plug coils 270 are pressed into cylinder head covers 250 to provide current to spark plugs (not shown). In the example shown, spark plug coils 270 follow a center line of engine cylinders in first cylinder bank 201 and second cylinder bank 202. PCV oil separator 190 is shown coupled to cylinder head cover 250 at a location on the vertically higher side of the cylinder head of first cylinder bank 201. Thus, PCV oil separator 190 is shown coupled to cylinder head cover 250 at a location vertically above the center line of cylinders in first cylinder bank 201. Oil separated from crankcase gases returns through a passage or channel covered by oil channel cover 260.

PCV oil separator 190 is shown on the vertically higher side of the cylinder head of first cylinder bank 201 so that more engine volume can be flushed with fresh air that is introduced to the engine crankcase. In one example, air from the engine intake manifold at a location upstream of the throttle is first directed to second cylinder bank 202 and is then drawn into the first cylinder bank 201. The air is returned to the intake manifold downstream of the engine throttle via first cylinder bank 201. In this way, gases that may accumulate in both cylinder banks may be directed to the engine air intake. By positioning the PCV oil separator 190 on the vertically higher side of the cylinder head, heated gases in the crankcase may rise to the PCV oil separator so as to improve ventilation in the engine. Further, placing PCV oil separator 190 in a vertically higher position may allow additional oil to precipitate out of the crankcase gases before entering the PCV oil separator. Consequently, the PCV oil separator may not have to separate out as much oil as other oil separators.

FIG. 2 also shows cutting planes for the views shown in FIGS. 3, 4C, and 5. The cutting plane for FIGS. 3 and 5 passes vertically through engine 200. The cutting plane for FIG. 4C passes through the cylinder head of first cylinder bank 210.

Referring now to FIG. 3, a cut-away of the V6 engine depicted in FIG. 2 is shown. Engine oil is held in engine oil sump 362 of oil pan 240 and at a level 360. Engine oil pan 240 is coupled to structural ladder frame 235. Structural frame 235 includes two exterior sidewalls 231 that form a portion of the engine sidewall. The exterior sidewalls 231 of structural frame 235 extend above the center of crankshaft bore 302. Structural frame 235 also extends across the engine so as to link or couple the exterior sidewalls 247 of engine cylinder block 230. Further, structural frame 235 is coupled to the exterior sidewalls 247 of engine cylinder block 230. Structural frame may also be coupled to crankshaft support 399. Structural frame 235 also includes oil passage 386 which forms a portion of the PCV oil return passage. Structural frame PCV oil passage 386 passes through and pierces exterior sidewall 231. The PCV oil passage also extends into oil pan 240 via tube 388. Tube 388 is submerged below the engine oil level to prevent flow of crankcase gases through structural frame PCV oil passage 386. Structural frame PCV oil passage 386 is in communication with engine cylinder block PCV oil passage 384. In one example, bolts coupling the structural frame to the engine cylinder block locate the structural frame PCV oil passage 386 to the engine cylinder block PCV oil passage 384.

Engine cylinder block 230 includes cylinder walls 32 and engine cylinder block 230 extends from a cylinder head engaging surface 257 to ladder frame engaging surface 255. Engine cylinder block 230 also includes crankshaft supports 399 and water jackets 114. One engine block exterior sidewall 247 includes engine cylinder block PCV oil passage 384.

Cylinder heads 210 are coupled to engine cylinder block 230 and include a top portion of combustion chamber 30. Cylinder heads 210 also include exhaust manifold 48 shown in greater detail in FIG. 4C. Spark plug service ports 355 provide access to spark plugs (not shown). One cylinder head 210 includes cylinder head PCV oil passage 382 which extends from a cylinder head engaging surface to a cylinder block engaging surface.

Cylinder head cover 250 is shown coupled to cylinder head 210. Cylinder head cover includes PCV oil channel 380 which traverses cylinder head cover 250. PCV oil channel 380 is in hydraulic communication with cylinder head PCV oil passage 382. PCV oil channel is supplied oil solely from PCV oil separator 190. PCV oil passage 382 is isolate from external elements via oil channel cover 260. Oil channel cover 260 is coupled to cylinder head cover 250.

In this way, PCV oil separator 190 returns oil to a PCV oil return passage that is comprised of cylinder head cover PCV oil channel 380, cylinder head PCV oil passage 382, engine cylinder block PCV oil passage 384, and structural frame PCV oil passage 386. PCV oil separator 190 is the sole supplier of oil to the PCV oil return passage so that passage pressure integrity is maintained from the beginning of the PCV oil passage to the end of the PCV oil passage. Consequently, a head of engine oil pressure can develop in the PCV oil passage to overcome the motive force (e.g., vacuum) assisting flow of crankcase gases to the engine air intake system.

Referring now to FIG. 4A, a plan view of cylinder head 210 and cylinder head cover 250 is shown. Spark plug coils 270 are arranged in a line following a center line of a bank of engine cylinders. PCV oil separator 190 is shown coupled to cylinder head 210 vertically above cylinders supplied spark via spark plug coils 270. Cylinder head PCV oil channel cover 260 traverses cylinder head cover 250 and a portion of cylinder head 210. Thus, oil separated from crankcases gases flows above and between engine cylinders via the cylinder head cover 250.

Referring now to FIG. 4B, a plan view of cylinder head cover 250 with cylinder head PCV oil channel cover 260 and PCV oil separator 190 removed is shown. Crankcase gases flow through cylinder head cover 250 via port 410. Port 410 pierces crankcase cover 250 allowing gases to enter the oil separator. Oil leaves the separator via port 420 and enters the cylinder head PCV oil channel 380. Oils leaves the cylinder head cover and enter an external wall of the cylinder head via port 405. It should be noted that cylinder head PCV oil channel 380 is sealed so that pressure may be maintained for the length of the PCV oil passage.

Referring now to FIG. 4C, a cut-away plan view of cylinder head 210 is shown. Cylinder head 210 includes exhaust manifold 48 which is comprised of exhaust runners 470 and confluence area 440. Exhaust gases exit engine cylinders at exhaust ports 425 and enter exhaust runners 470. Cylinder head 210 also includes intake runners 435 that supply air to engine cylinder via intake ports 410. Cylinder head PCV oil passage 382 is positioned between exhaust manifold runners 470 and vertically above confluence area 440. Cylinder head PCV oil passage 382 may be positioned at other alternative locations along the exterior wall of cylinder head 210, if desired.

Referring now to FIG. 5, a cut-away second of another example V6 engine is show. The cut-away of FIG. 5 includes may of the features shown in FIG. 3. Therefore, common numerical identifiers are included in the figures. Further, the description provided for FIG. 3 applies to the elements of FIG. 5. For the sake of brevity, a description of common elements is omitted.

Engine 200 includes an oil dipstick 502 for determining a level of engine oil in the engine oil sump 362. Oil dipstick 502 enters cylinder head cover 250 and follows cylinder head cover PCV oil passage 380 into cylinder head PCV oil passage 382. Oil dipstick 502 continues to engine cylinder block PCV oil passage 384 and into structural frame PCV oil passage 386. Finally, oil dipstick 502 enters tube 388 before terminating in engine oil sump 362.

Thus, the PCV oil return passage extending through the cylinder head cover, cylinder head, engine block, and structural frame guides oil dipstick 502 into oil sump 362. In this way, the PCV oil return passage can be combined with the oil dipstick to increase the functionality of the PCV oil return. Further, an external oil dipstick tube is not required and engine structure is used to further advantage.

Oil dipstick 502 includes a seal 504 for sealing the PCV oil return passage from external elements. Further, the seal can maintain pressure within the PCV oil return passage so that an oil head pressure may develop. In some examples, the seal may extend into the PCV oil passage so as to improve sealing.

Thus, the system illustrated in FIGS. 1-5 provides for an engine system, comprising: an engine cylinder block; a cylinder head coupled to the engine cylinder block; a cylinder head cover coupled to the cylinder head; a dipstick and PCV oil passage extending through the cylinder head cover, the cylinder head, and the engine cylinder block to an engine crankcase. The engine system further comprises a PCV oil separator, the PCV oil separator coupled to the exterior of the cylinder head, the PCV oil separator in pneumatic communication with an interior of an engine at a location between the cylinder head and the cylinder head cover, the PCV oil separator in hydraulic communication with a crankcase of the engine. The engine system also includes where the PCV oil separator includes an oil passage exit solely in hydraulic communication with the dipstick and PCV oil passage. In some examples, the engine system further comprises a cylinder head cover oil passage comprised of a channel in the cylinder head cover and an oil channel cover. The engine system also includes where the cylinder head cover oil passage hydraulically couples the dipstick and PCV oil passage and a PCV oil separator. The engine system further includes where a portion of the dipstick and PCV oil passage is positioned between two exhaust runners of an exhaust manifold integrated with the cylinder head. In this way, engine structure may be used more efficiently. In one example, the engine system further comprises a dipstick and a seal, the seal positioned between the dipstick and the dipstick and PCV oil passage.

The system shown in FIGS. 1-5 also provides for a engine system, comprising: a cylinder head; a cylinder head cover coupled to the cylinder head; an PCV oil separator coupled to an exterior of the cylinder head cover; a cylinder head cover oil passage within the cylinder head cover providing hydraulic communication between the PCV oil separator and a cylinder head exterior sidewall; a cylinder head oil passage in an exterior sidewall of the cylinder head and in hydraulic communication with the cylinder head cover oil passage; and an engine block oil passage providing hydraulic communication between the cylinder head oil passage and an engine oil sump. The engine system also includes where the cylinder head oil passage is positioned between first and second exhaust manifold runners of an exhaust manifold within the cylinder head. The engine system also includes where the first and second exhaust manifold runners exit the cylinder head via a single exhaust port. In one example, the engine system includes where the cylinder head cover oil passage traverses the cylinder head cover between two spark plug service ports. The engine system further includes where the cylinder head oil passage is supplied oil solely via the PCV oil separator. The engine system further comprises a dipstick and PCV oil passage comprising at least a portion of the cylinder head oil passage, the cylinder head cover oil passage, and the engine block oil passage. In still another example, the engine system further comprises a dipstick and a seal, the seal positioned between the dipstick and the dipstick and PCV oil passage.

Referring now to FIG. 6, a flowchart of an example method for separating oil from crankcase gases is shown. At 602, engine crankcase gases are passed from the engine crankcase to the high side of a cylinder head beneath a cylinder head cover and above the cylinder head. In one example, crankcase gases may be flushed though the engine via coupling the interior of the engine to the engine air intake system as described with respect to FIG. 1. Method 600 proceeds to 604 after passing crankcase gases to the cylinder head.

At 604, oil is separated from engine crankcase gases. In one example, engine crankcase gases may be passed though a labyrinth structure so that crankcase gases impinge on walls of the labyrinth. The walls of the labyrinth cause the oil precipitate and separate from the crankcase gases. In other examples, other types of oil separators may be provided. Method 600 proceeds to 606 after separating engine oil from crankcase gases.

At 606, method 600 passes oil that has been separated from crankcase gases over a cylinder head cover. Further, PCV oil is directed between exhaust manifold runners of an exhaust manifold. The PCV oil passage may be positioned such that heating of the oil from the runners is minimized (e.g., via routing the PVC oil return passage at a position that is greatest from adjacent exhaust runners). Method 600 proceeds to 608 after passing oil between exhaust manifold runners.

At 608, method 600 transfers PCV separated oil to the engine oil sump via a passage receiving oil solely from a PCV oil separator. By having an oil passage that has a single source of oil, pressure in the oil passage may be maintained so that a head of oil pressure may be developed to overcome a motive force moving crankcase gases through the engine. Further, oil may be continuously separated and returned to the engine crankcase even during engine operating conditions that include high intake manifold vacuum. Method 600 proceeds to exit after separate oil is returned to the engine crankcase and sump.

Thus, the method of FIG. 6 provides for passing gases from an engine crankcase to an area of a cylinder head; separating oil from the gases via an oil separator; and transferring the oil separated from the gases to the engine crankcase via an oil passage receiving oil solely via the oil separator, the oil passage extending from the cylinder head to the engine crankcase and capable of accepting an oil dipstick. The method also includes where at least a portion of the oil passage is positioned between two exhaust runners of an exhaust manifold integrated into the cylinder head. The method further comprises drawing the gases into an engine air intake via a vacuum. The method also includes where the oil passage passes through a cylinder head cover, a cylinder head, and an engine cylinder block. The method also includes where the oil separator is coupled to the cylinder head at a location above a centerline of cylinders covered by the cylinder head. In another example, the method further comprises releasing oil separated from the gases to an area of the engine crankcase submerged in engine oil.

As will be appreciated by one of ordinary skill in the art, the method described in FIG. 6 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. An engine system, comprising:
   an oil separator coupled to a cylinder head cover on an exterior side of the cylinder head cover; and
   a combined dipstick and PCV oil drain passage extending from the oil separator to an exterior wall of the cylinder head cover, to an exterior wall of a cylinder head, to an exterior wall of a cylinder block, and to a crankcase.

2. The engine system of claim 1, where the cylinder block is a V-shaped cylinder block and the oil separator is a PCV oil separator, the PCV oil separator positioned on a vertically higher side of the cylinder head cover referenced to a cylinder centerline, the PCV oil separator in communication with an interior of an engine at a location between the cylinder head and the cylinder head cover, the PCV oil separator in communication with the crankcase of the engine via the combined dipstick and PCV oil drain passage.

3. The engine system of claim 2, where the PCV oil separator includes an oil passage exit solely in hydraulic communication with the combined dipstick and PCV oil drain passage, where the combined dipstick and PCV oil drain passage is formed in the cylinder head cover and extends outside the cylinder head cover from the PCV oil separator on the vertically higher side of the cylinder head cover, referenced to a cylinder centerline, to a vertically lower side of the cylinder head cover, and where the combined dipstick and PCV oil drain passage extends from the vertically lower side of the cylinder head cover, referenced to a cylinder centerline, through the exterior wall of the cylinder head cover, through the exterior wall of the cylinder head, through the exterior wall of the V-shaped cylinder block, and into the crankcase.

4. The engine system of claim 1, where the oil separator is positioned on a vertically higher side of the cylinder head cover, referenced to a cylinder centerline, and includes a port extending through the cylinder head to the oil separator.

5. The engine system of claim 4, where the cylinder block is V-shaped, where the combined dipstick and PCV oil drain passage includes a cylinder head cover oil passage comprised of a channel in the exterior wall of the cylinder head cover and an oil channel cover, the cylinder head cover oil passage hydraulically coupling the combined dipstick and PCV oil drain passage and the oil separator.

6. The engine system of claim 1, where a portion of the combined dipstick and PCV oil drain passage is positioned between two exhaust runners of an exhaust manifold integrated with the cylinder head.

7. The engine system of claim 1, further comprising a dipstick and a seal, the seal positioned between the dipstick and the combined dipstick and PCV oil drain passage.

8. An engine system, comprising:
   a cylinder head;
   a cylinder head cover coupled to the cylinder head;
   a PCV oil separator coupled to an exterior side of the cylinder head cover on an exterior side of an engine, the PCV oil separator on a vertically higher side of the cylinder head referenced to a cylinder centerline;
   a cylinder head cover oil passage on an exterior wall of the cylinder head cover and providing hydraulic communication between the PCV oil separator and a cylinder head exterior sidewall, the cylinder head exterior sidewall on a vertically lower side of the cylinder head referenced to a cylinder centerline; sharing same passage with a dipstick
   a cylinder head oil passage in the exterior sidewall of the cylinder head and in hydraulic communication with the cylinder head cover oil passage; and
   an engine block oil passage providing hydraulic communication between the cylinder head oil passage and an engine oil sump, where the cylinder head cover oil passage, the cylinder head oil passage, and the engine block oil passage are included in a combined dipstick and PCV oil drain passage.

9. The engine system of claim 8, where the cylinder head oil passage is positioned between first and second exhaust manifold runners of an exhaust manifold within the cylinder head.

10. The engine system of claim 9, where the first and second exhaust manifold runners exit the cylinder head via a single exhaust port.

11. The engine system of claim 8, where the cylinder head cover oil passage traverses the cylinder head cover between two spark plug service ports.

12. The engine system of claim 8, where the cylinder head oil passage is supplied oil solely via the PCV oil separator, and where the cylinder head cover includes a port extending through the cylinder head cover to the PCV oil separator.

13. The engine system of claim 8, where the combined dipstick and PCV oil drain passage is a sealed passage.

14. The engine system of claim 13, further comprising a dipstick and a seal, the seal positioned between the dipstick and the combined dipstick and PCV oil drain passage.

15. An engine method, comprising:
   passing gases from a crankcase of a V-shaped engine through a cylinder head cover at a location on a vertically higher side of the cylinder head cover, referenced to a cylinder centerline;
   separating oil from the gases via an oil separator; and
   transferring the oil separated from the gases to the engine crankcase via a combined dipstick and PCV oil drain passage receiving oil solely via the oil separator, the combined dipstick and PCV drain passage extending from outside the cylinder head cover to the engine crankcase.

16. The engine method of claim 15, where at least a portion of the oil passage is positioned between two exhaust runners of an exhaust manifold integrated into a cylinder head, further comprising passing gases from the cylinder head to the oil separator, the oil separator positioned on an exterior side of the cylinder head cover, the cylinder head cover coupled to the cylinder head, where the oil passage extends from the oil separator to the engine crankcase solely via exterior walls of the cylinder head cover, the cylinder head, and an engine block, and where the cylinder head is coupled to a V engine block.

17. The engine method of claim 15, further comprising drawing the gases into an engine air intake via a vacuum.

18. The engine method of claim 15, where the oil passage passes outside the cylinder head cover, through a wall of the cylinder head cover, through a cylinder head, and through an engine cylinder block exterior wall.

19. The engine method of claim 18, where the oil separator is coupled to the cylinder head at a location above a centerline of cylinders covered by the cylinder head.

20. The engine method of claim 15, further comprising releasing oil separated from the gases to an area of the engine crankcase submerged in engine oil.

* * * * *